(12) United States Patent
Ohnishi

(10) Patent No.: US 6,556,620 B1
(45) Date of Patent: Apr. 29, 2003

(54) SYNCHRONIZATION ACQUISITION DEVICE FOR BOTH PREVENTING ERRONEOUS DETECTION DUE TO NOISE AND REDUCING REQUIRED STORAGE CAPACITY

(75) Inventor: Osamu Ohnishi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/484,444

(22) Filed: Jan. 18, 2000

(30) Foreign Application Priority Data

Jan. 21, 1999 (JP) .......................................... 11-013236

(51) Int. Cl.⁷ ............................................. H04B 1/707
(52) U.S. Cl. ....................................... 375/149; 375/150
(58) Field of Search ................................. 375/130, 142, 375/143, 145, 149, 150, 152; 370/320, 335, 342, 441

(56) References Cited

U.S. PATENT DOCUMENTS

| | | | | |
|---|---|---|---|---|
| 5,982,763 A | * | 11/1999 | Sato | 370/342 |
| 6,167,037 A | * | 12/2000 | Higuchi et al. | 370/335 |
| 6,263,010 B1 | * | 7/2001 | Naruse et al. | 375/130 |
| 6,285,885 B1 | * | 9/2001 | Honda | 455/456 |

FOREIGN PATENT DOCUMENTS

| | | |
|---|---|---|
| JP | 9-130299 | 5/1997 |
| JP | 10-164008 | 6/1998 |
| JP | 11-17648 | 1/1999 |
| JP | 11-68618 | 3/1999 |
| JP | 2894342 | 3/1999 |
| JP | 11-205190 | 7/1999 |
| JP | 11-261446 | 9/1999 |

* cited by examiner

Primary Examiner—Don N. Vo
(74) Attorney, Agent, or Firm—Foley & Lardner

(57) ABSTRACT

A synchronization acquisition device in a spread spectrum communication system is disclosed that can both reduce the required storage capacity and prevent erroneous detection caused by such factors as noise. In the first correlation value processing, the control circuit causes only the N highest-ranking values of correlation values obtained by a correlator to be stored in a timing-correlation value storage unit. In the second and subsequent calculations, the control circuit stores $K \times P_{IN} + (1-K) \times P_j$ as the new value if a timing corresponding to the obtained correlation value $P_{IN}$ has already been stored, and stores $K \times P_{IN}$ as the new value if a corresponding timing is not stored but the obtained correlation value is greater than the $N^{th}$ correlation value that is stored. Instead of storing correlation values of all timings of a fixed interval portion, only correlation values that are peak candidates and the associated timing information are stored, and as a result, the device allows a reduction in the required storage capacity. In addition, in slot averaging processing, the reordering of timings that are peak candidates is based only on actual correlation values and not on dummy value, and erroneous detection due to such factors as noise therefore can be reduced.

8 Claims, 13 Drawing Sheets

Fig. 10

| timing | correlation value | |
|---|---|---|
| $T_1$ | $P_1$ | |
| $T_2$ | $P_2$ | |
| ⋮ | ⋮ | N |
| $T_N$ | $P_N$ | |
| $T_{N+1}$ | $P_{N+1}$ | |
| ⋮ | ⋮ | M |
| $T_{N+M}$ | $P_{N+M}$ | |

SYNCHRONIZATION ACQUISITION DEVICE FOR BOTH PREVENTING ERRONEOUS DETECTION DUE TO NOISE AND REDUCING REQUIRED STORAGE CAPACITY

BACKGROUND OF THE INVENTION

1. Field of the Invention

The present invention relates to a synchronization acquisition device and a method of performing synchronization acquisition in a spread spectrum communication system for performing synchronization acquisition in a receiver that employs the spread spectrum communication method.

2. Description of the Related Art

In recent years, the spread spectrum communication system, which is effective against interference and disturbances, has received increased attention as a communication system for use in mobile communication systems. A spread spectrum communication system is a communication system in which, on the transmitting side, a spreading code is used to spread an information signal that is to be transmitted, and on the receiving side, a spreading code that is the same as this spreading code is used to carry out despreading and obtain the original information signal.

The information signal that is transferred as information is called a symbol, and the unit of data constituting the spreading code for spreading these symbols is called a chip.

In such a spread spectrum communication system, a plurality of transmitting sides each carries out spreading using different spreading codes having orthogonality, and each communication can be designated on the receiver side by selecting the spreading code used when carrying out despreading. As a result, Code Division Multiple Access (CDMA) can be realized in which a plurality of communications use the same frequency band.

In a transmitting/receiving system according to this spread spectrum communication system, however, despreading cannot be properly achieved if the spreading timing, which is the timing at which spreading is carried out on the transmitting side, is not accurately obtained on the receiving side. If this spreading timing is shifted by just one chip, for example, none of the signals transmitted from the transmitting side can be received on the receiving side. A synchronization acquisition device for obtaining the spreading timing is therefore provided in receivers of the spread spectrum communication system. Synchronization acquisition refers to receiving from a transmitter reception data in which data of a specific timing are spread by a specific spreading code, and using this specific spreading code to obtain the specific timing.

In this way, an example of data in which data of a specific timing are spread by a specific spreading code is explained using a W-CDMA (Wide-band CDMA) system, which is one type of CDMA communication system. A W-CDMA system is one spread spectrum communication system that has been applied to mobile communication systems.

In the W-CDMA system that is described here, a mobile station can obtain base station information, such as the spreading code and spreading timing that the base station uses when carrying out spreading of logical symbols, by receiving a perch channel transmitted from the base station.

The spreading codes in this W-CDMA system include a long code (long-period spreading code) and a short code (short-period spreading code), and logical symbols in a W-CDMA system are spread twice by this long code and short code. A long code is a code of an extremely long period corresponding to the length of several tens or several hundreds of symbols, and short code is a code of short period corresponding to the length of one symbol.

Referring now to FIG. 1, the data structure of a perch channel is explained. In a W-CDMA system, data to be transmitted are transmitted in units of superframes of 640 msec. Perch channel 30 is one of these superframes and is composed of 64 radio frames $31_1$–$31_{64}$ for transferring information of each receiver. Radio frame $31_1$ is in turn composed of 16 time slots $32_1$–$32_{16}$, and time slot $32_1$ is composed of pilot symbol 33, BCCH (Broadcast Control CHannel) symbol 34, and long code mask symbol 35.

Since the case explained here regards a W-CDMA system in which the spreading code length of the short code is 256 chips, a one-bit logical symbol is spread to 256 chips.

Long-code mask symbol 35 is a signal in which a particular one-bit logical symbol is spread by only the short code and not spread by the long code. All logical symbols other than long-code mask symbol 35 are spread by both long-code and short-code spreading codes. As a result, if signals that are demodulated by RF unit 1 are subjected to despreading by only the short code, only long-code mask symbol 35 appears as the original symbol. A synchronization acquisition device takes advantage of this fact to detect the spreading timing.

FIG. 2 shows one example of the composition of a receiver in a spread spectrum communication system that is provided with this type of synchronization acquisition device. The receiver in this spread spectrum communication system includes RF unit 1, A/D converter 2, and synchronization acquisition device 13.

RF unit 1 modulates signals received from a transmitter and converts the signals to baseband signals. A/D converter 2 carries out A/D conversion of the baseband signals that were demodulated by RF unit 1 to convert the signals to digital signals. Synchronization acquisition device 13 performs synchronization acquisition by using digital data that were converted by A/D converter 2.

FIG. 3 shows the configuration of this synchronization acquisition device 13. Synchronization acquisition device 13 is composed of correlator 4, adder 20, correlation value storage unit 21, and peak detector 22.

Correlator 4 calculates correlation values between digital data outputted from A/D converter 2 and preset spreading codes. As for the actual constitution of correlator 4, matched filters may be used that hold digital data the length of the spreading code and simultaneously calculate correlation values with the spreading code, or a correlator bank may be used that sequentially calculates correlation values between the spreading code and digital data and accumulates these correlation values.

In this case, correlation values are calculated as electrical values in a W-CDMA system, quadruple over-sampling normally being carried out when calculating electrical values. If the spreading length of short code in this case is 256 chips and the number of symbols in one time slot is 10, the timing number, which is the number of data items in one slot interval, is:

4 (quadruple sampling)×256 (chips)×10 (symbols)=10,240.

FIG. 4 shows an example of the correlation values for each timing obtained by correlator 4. In FIG. 4, the correlation values of the 10240 timings of one slot interval have been artificially produced and represented as a graph for the purpose of explaining actual data. Here, cases in which the correlation values exhibit high values are cases in which digital data and short code match. The occurrence of a plurality of these timings in this graph indicates that this mobile station is receiving radio waves from a plurality of base stations.

Data of correlation values in a one-slot interval are shown. In a mobile communication system made up of a mobile station and a plurality of base stations, the mobile station communicates with base stations while moving, and the obtained correlation values therefore fluctuate widely due to the influence of such factors as fading. The obtained correlation values in some cases may drop sharply when fading is high, giving the perception that no radio waves at all are being received from the base station.

To solve this type of problem, a slot averaging process is carried out to prevent malfunctions due to loss of data caused by fading whereby, rather than detecting spreading timing based on the correlation value data at a single time, an average of the correlation value data is calculated for each slot interval.

Adder 20 adds correlation values found in correlator 4 and correlation values read from correlation value storage unit 21.

Correlation value storage unit 21 stores the accumulated correlation values obtained by adder 20 as new correlation values. If, as an example, a correlation value is represented by 32 bits, correlation value storage unit 21 must have a data storage capacity of 10240×32 bits of data to store correlation values for each timing.

Peak detector 22 carries out synchronization acquisition by detecting peaks in data for each timing obtained by correlation value storage unit 21 when a predetermined number of slot averaging has been completed.

Explanation is next presented regarding the operations in the slot averaging calculation process in synchronization acquisition device 13 of the prior art.

Correlation values represented in 32 bits for each timing are continuously applied to adder 20 from correlator 4. Correlation value storage unit 21 then reads the past accumulated value of a timing that has been received and outputs this read accumulated value to adder 20. In adder 20, the accumulated value outputted from correlation value storage unit 21 is added to the new correlation value from correlator 4 to calculate a new accumulated value, and this value is outputted to correlation value storage unit 21. At correlation value storage unit 21, the new accumulated value is stored as the accumulated value of that timing in place of the accumulated value for that timing that is currently stored.

The foregoing explanation relates to the slot averaging calculation process at one timing, but the same operation is carried out for 10240 timings, and as a result, 10240×32 bits of data must be stored in correlation value storage unit 21 to take the averages of all data for each slot interval in synchronization acquisition device 13. As a consequence, registers such as F/F (flip-flops), which have a limited storage capacity, cannot be used in correlation value storage unit 21 to store such a large volume of data, and a storage device such as external RAM is necessary.

In addition, carrying out the slot averaging calculation process of data for a particular timing received from correlator 4 in this synchronization acquisition device 13 of the prior art necessitates repetition of the operations of writing a newly obtained accumulated value to correlation value storage unit 21 once the accumulated value of the correlation values at that timing is read from correlation value storage unit 21 and a new accumulated value is obtained.

If correlation value storage unit 21 is constituted by external RAM, this external RAM must be frequently accessed. However, since accessing external RAM requires a relatively long time interval compared with the time for reading and writing data that are stored in registers such as F/F, the time required for the slot averaging processing becomes quite lengthy.

A synchronization acquisition device that reduces storage capacity in order to solve this problem is described in the specification of Japanese Patent Application No. 63099/98.

FIG. 5 shows this synchronization acquisition device 23. Reference numerals that are the same as those used in FIG. 3 identify equivalent constituent elements. Synchronization acquisition device 23 is made up of correlator 4, N highest-ranking value detector 24, base value calculator 25, average calculator 26, and timing-correlation value storage unit 27.

Of the correlation values for each timing obtained by correlator 4, N highest-ranking value detector 24 stores just N values starting from data of the highest values, N being a predetermined number, and makes the $N^{th}$ item of data the threshold value. Upon completion of one slot interval, N highest-ranking value detector 24 outputs the N items of data together with the associated timing information to average calculator 26 and outputs the threshold value to base value calculator 25.

Base value calculator 25 calculates a base value by accumulating the threshold values found in N highest-ranking value detector 24 and stores this base value. Average calculator 26 carries out a process as described below for the N items of data and the associated timing information that were received from N highest-ranking value detector 24.

(1) If data of the timing are already stored in timing-correlation value storage unit 27, average calculator 26 adds the data obtained in this calculation to the stored data to produce new data.

(2) If data of the timing are not stored in timing-correlation value storage unit 27, average calculator 26 adds the data obtained in this calculation to the base value to produce new data.

(3) Average calculator 26 adds the threshold value to data of the timing for which data were not newly produced in this process at the timing for which data were stored in timing-correlation value storage unit 27.

Average calculator 26 then sorts (rearranges) the newly produced data in order starting from higher values; discards data other than M highest-ranking items of data if the number of items of data exceeds a predetermined number M; and stores the M items of data together with the timing information in timing-correlation value storage unit 27. Timing-correlation value storage unit 27 stores the data while maintaining a correspondence between the correlation values calculated by average calculator 26 and the associated timing information.

Referring now to FIG. 5, FIG. 6, and FIG. 7, explanation is next presented regarding the operation of synchronization acquisition device 23. FIG. 6 is a graph of correlation values obtained by correlator 6 for each timing, and FIG. 7 is a flow chart showing the operations of synchronization acquisition device 23. Here, as with FIG. 4, FIG. 6 is a graph of data that were artificially produced for the purpose of explaining the actual data.

In the graph of this FIG. 6, moreover, correlation values are shown in order starting from the highest value from ① to ⑥. Since N is 6 in this FIG. 6, the threshold value is the value of data that is sixth from the highest rank and is indicated by ⑥.

The operation of the synchronization acquisition device 23 is next explained using the flow chart of FIG. 7.

First, data from RF unit 1 is converted to digital data by A/D converter 2. Next, correlation values between the digital data and the short code are calculated in correlator 4 in Step 81. In Step 83, N highest-ranking value detector 24 next holds only as far as the $N^{th}$ (sixth in the example shown in FIG. 6) value from the highest ranking value of the correlation values. In Step 84, it is determined whether or not the operations to this point have been carried out for all data of the 10240 timings. If it is determined in Step 84 that operations to this point have been carried out for all data of the 10240 timings, the $N^{th}$ item of data in N highest-ranking value detector 24 is outputted to base value calculator 25 as the threshold value in Step 85, and in base value calculator 25, the threshold values are accumulated and stored as the base value.

In average calculator 26, the following processing is carried out for the extracted N items of data in N highest-ranking value detector 24.

First, it is determined in Step 86 whether or not data of that timing are stored in timing-correlation value storage unit 27. If it is determined in Step 86 that the data are stored, the value obtained this time is added to the value stored at that timing to produce data 1 in Step 87. If it is determined in Step 86 that data are not stored in timing-correlation value storage unit 27, the base value stored in base value calculator 25 is added to the value obtained this time to produce data 2 in Step 88.

When this processing has been completed for the N highest-ranking values in Step 89, average calculator 26 adds the threshold value for this time to the values of other timings of timing-correlation value storage unit 27 to produce data 3 in Step 90.

In Step 91, data 1, 2, and 3 are next sorted in average calculator 26, and the result of this sorting is stored in timing-correlation value storage unit 27. If the number of items of data in which data 1, 2, and 3 have been sorted exceeds M in this case, only the M highest-ranking items of data are stored in timing-correlation value storage unit 27, and the remaining data are discarded.

All processing is completed in Step 92 when the above-described processing has been completed a number of times equal to a predetermined number of slot averaging.

An actual example of this slot averaging calculation is next described using FIGS. 8a–8c. These FIGS. 8a–8c each show the circumstances in which correlation values are added at one particular timing.

Here, FIG. 8a shows a case in which the correlation values obtained at a particular timing do not vary widely, FIG. 8b shows a case in which the obtained correlation values gradually decrease, and FIG. 8c shows a case in which the obtained correlation values gradually increase. In these FIGS. 8a–8c, the blocks shaded by diagonal lines indicate the threshold values, and the other blocks indicate data.

First, in FIG. 8a, data from the first to third times were added because these data all fall within the N highest-ranking values. The obtained correlation value for the fourth item of data, however, did not fall within the N highest-ranking values due to some random factor such as fading. The threshold value was therefore added for this calculation. The fifth and subsequent calculations again fell within the N highest-ranking values, and these data are added. In this way, drastic decreases in the accumulated value of data can be prevented by adding the threshold values for data at timings for which correlation values could not be obtained due to random factors.

Next, in FIG. 8b, the first to fourth items of data all fall within the N highest-ranking values, but the fifth and later items of data do not fall within the N highest-ranking values due to factors such as increase in the distance between the base station and mobile station. As a result, the threshold value of each calculation is added to the accumulated value up to this point for the fifth and subsequent calculations. However, since only the threshold value is added to this timing data, its rank within data that are stored in timing-correlation value storage unit 27 gradually decreases, eventually to be discarded when it does not fall within the M highest-ranking values. Since only the threshold values are added for data at timings at which the obtained correlation values gradually decrease, these data are eventually discarded from the M highest-ranking items of data.

Finally, in FIG. 8c, since the first to fourth items of data do not fall within the N highest-ranking values, the timing data for these cases are not stored in timing-correlation value storage unit 27. However, the data do fall within the N highest-ranking values beginning with the fifth item, and average calculator 26 therefore adds the base value and the data for these cases to generate new data which are stored in timing-correlation value storage unit 27. Data for timings for which the obtained correlation values gradually increase in this way can be appropriately compared with data for other timings by adding the base value as the past accumulated value.

In this synchronization acquisition device 23 of the prior art, the amount of data to be held in timing-correlation value storage unit 27 for a case in which, for example, M=20 and the timing information is 14 bits, is: 20×(32 bits (data)+14 bits (timing information). This amount of data is 1/356 of the amount of memory (10240×32 bits) of the prior-art synchronization acquisition device 13 shown in FIG. 3. This synchronization acquisition device 23 therefore can cut the amount of memory required for the slot averaging calculation process and therefore can also reduce the circuit scale.

In addition, this prior-art synchronization acquisition device 23 reads data M times and writes data M times to timing-correlation value storage unit 27 in the slot averaging calculation process for one slot interval. Compared with prior-art synchronization acquisition device 13, which reads 10240 times and writes 10240 times to correlation value storage unit 21, synchronization acquisition device 23 allows a drastic reduction of the time required for reading and writing data.

Further, this prior-art synchronization acquisition device 23 has no need for voluminous storage capacity in timing-correlation value storage unit 27 and can employ storage devices such as F/F that require little time for reading and writing instead of external RAM, which entails time-consuming reading and writing. The multiplied effect of using, for example, F/F combined with the substantial reduction in the number of times of reading and writing to timing-correlation value storage unit 27 allows a drastic decrease in the processing time for the slot averaging calculation process.

Although the required amount of memory can be reduced in this prior-art synchronization acquisition device 23, the addition of threshold values and base values, which are dummy data, to correlation values brings about a significant difference between correlation values obtained after the averaging process and the actual correlation values. Although this type of synchronization acquisition device 23 may not encounter problems under normal conditions, there is the possibility that the use of dummy data under conditions of poor Signal-to-Interference Noise Ratio may cause a drop in the accuracy of synchronization acquisition, and in a worst case, malfunctions can be expected.

For example, if the sixth correlation value from the highest rank, which becomes the threshold value, becomes a higher value than expected in the above-described example, the problem arises that timings for which the correlation values become steadily smaller will always remain in timing-correlation value storage unit 27. Conversely, the problem may also arise that, in a case in which the threshold values and base values are lower than expected, the sudden occurrence of timings for which high correlation values are obtained will not be accepted in timing-correlation value storage unit 27.

SUMMARY OF THE INVENTION

It is an object of the present invention to provide a synchronization acquisition device that can both perform synchronization acquisition with high accuracy and cut storage capacity.

To achieve the above-described objects, the synchronization acquisition device according to the present invention comprises a correlation detecting means, a timing-correlation value storing means, a first multiplying means, a second multiplying means, an adding means, a selecting means, and a control means.

The correlation detecting means calculates correlation values between digital data, which have been obtained by A/D converting received signals that have been demodulated, and specific spreading codes. The timing-correlation value storing means stores both the data of correlation values and associated timings. The first multiplying means multiplies correlation values obtained by the correlation detecting means by a coefficient K ($0<K\leq1$) and outputs the result. The second multiplying means multiplies correlation values read from the timing-correlation value storing means by a coefficient ($1-K$) and outputs the result. The adding means adds values outputted from the first multiplying means and values outputted from the second multiplying means and outputs the result. The selecting means selects and outputs one of the output of the adding means and the output of the first multiplying means.

In the first correlation value calculation, the control means stores in the timing-correlation value storing means only data of the N highest-ranking correlation values of correlation values of a fixed interval portion obtained in the correlation detecting means, N being a predetermined number. Then, in the second and subsequent correlation value calculations, the control means determines whether or not a timing for which correlation values is obtained in the correlation detecting means is stored in the timing-correlation value storing means; and if the timing is stored in the timing-correlation value storing means, instructs the selecting means to output the output from the adding means to the timing-correlation value storing means. If the timing is not stored in the timing-correlation value storing means and if the associated correlation value is greater than the $N^{th}$ correlation value $P_N$ stored in the timing-correlation value storing means, the control means instructs the selecting means to output the output from the first multiplying means to the timing-correlation value storing means. If the timing is not stored in the timing-correlation value storing means and if the associated correlation value is equal to or lower than the $N^{th}$ correlation value $P_N$ that is stored in the timing-correlation value storing means, the control means instructs the timing-correlation value storing means not to carry out any processing on output from the selecting means. The control means then outputs the timing information stored in the timing-correlation value storing means upon completion of a number of correlation value calculations equal in number to a prescribed number of averages.

The present invention does not cause the correlation values of all timings of a fixed interval portion to be stored in timing-correlation value storing means, but rather, causes only correlation values that become peak candidates and associated timing information to be stored in timing-correlation value storing means, thereby allowing a reduction in the necessary storage capacity. The present invention moreover reduces instances of erroneous detection caused by such factors as noise, because the reordering of timings that become peak candidates in an averaging process that calculates the averages of the correlation values of a plurality of fixed intervals is carried out based only on actual correlation values and without using dummy values. Accordingly, the storage capacity required by the timing-correlation value storing means can be cut and synchronization acquisition of higher accuracy can be achieved.

In addition, according to an embodiment of the present invention, the correlation detecting means is a matched filter or a correlator bank.

According to another embodiment of the present invention, the coefficient K is a variable.

According to yet another embodiment of the present invention, the coefficient K used in the first correlation value calculation differs from the coefficient K used in the second and subsequent correlation value calculations.

The above and other objects, features, and advantages of the present invention will become apparent from the following description with reference to the accompanying drawings which illustrate examples of the present invention.

BRIEF DESCRIPTION OF THE DRAWINGS

FIG. 10 shows the stored content of timing-correlation value storage unit 10 in FIG. 9;

DETAILED DESCRIPTION OF THE PREFERRED EMBODIMENTS

Figure 9:
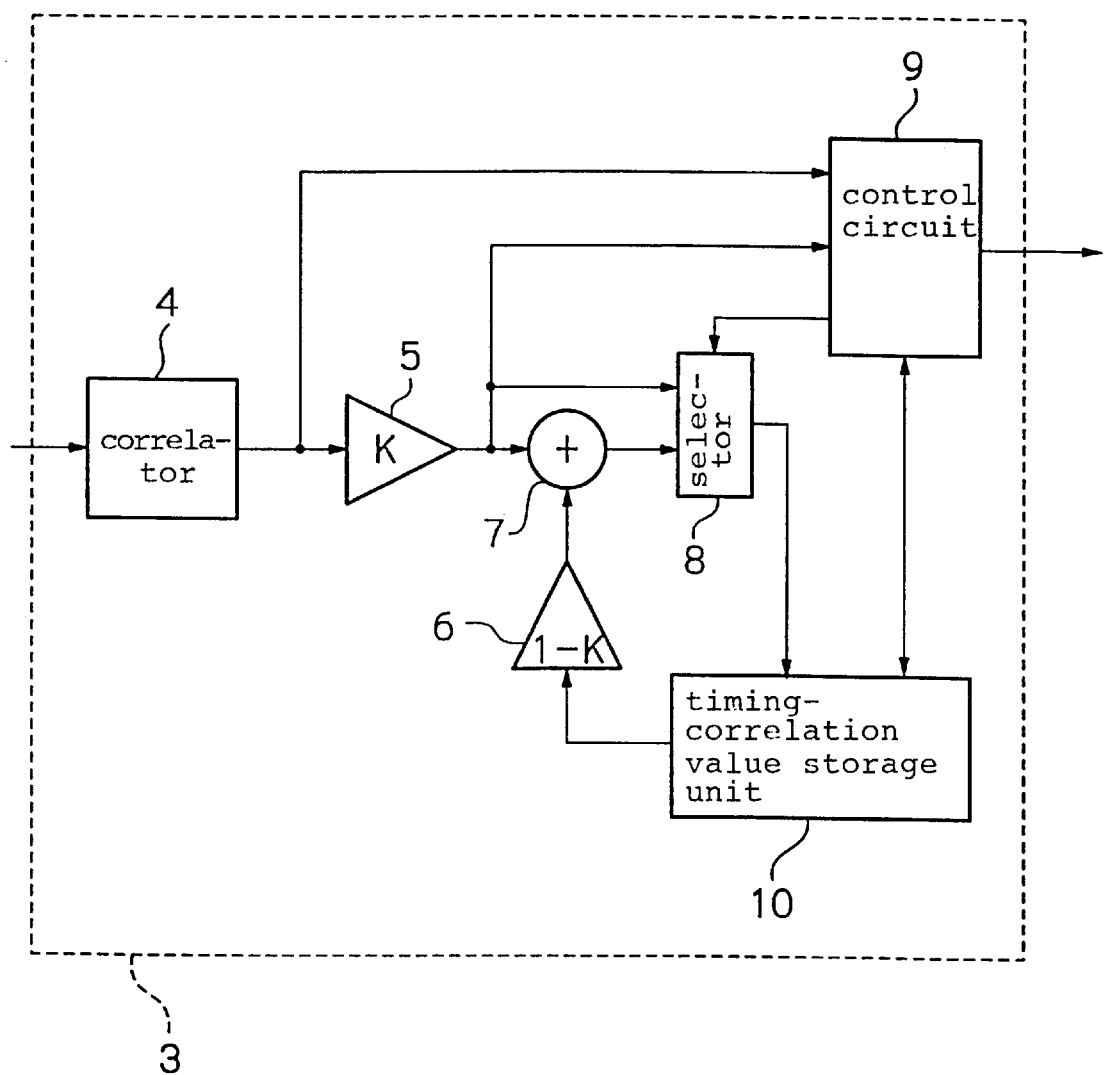
FIG. 9 is a block diagram showing the configuration of synchronization acquisition device 3 in a spread spectrum communication stem according to an embodiment of the present invention.

Referring now to FIG. 9, synchronization acquisition device 3 in a spread spectrum communication system according to the first embodiment of the present invention comprises: correlator 4, multipliers 5 and 6, adder 7, selector 8, control circuit 9, and timing-correlation value storage unit 10.

Multiplier 5 multiplies correlation values obtained by correlator 4 by coefficient K ($0<K\leq1$) and outputs the result. Multiplier 6 multiplies the correlation values read from timing-correlation value storage unit 10 by coefficient 1−K and outputs the result. Adder 7 adds the values outputted from multiplier 5 and the values outputted from multiplier 6 and outputs the result. Selector 8 selects either the output of adder 7 or the output of multiplier 5 in accordance with instructions from control circuit 9 and outputs the result. In the first correlation value calculation, control circuit 9 causes only the data that are within N highest ranking values of the correlation values obtained in correlator 4 to be saved to timing-correlation value storage unit 10.

In the second and subsequent correlation value calculations, control circuit 9 determines whether or not the obtained timing at which correlation value $P_{IN}$ was obtained in correlator 4 is stored in timing-correlation value storage unit 10, and if the timing is saved in timing-correlation value storage unit 10, control circuit 9 instructs selector 8 to output the output from adder 7 to timing-correlation value storage unit 10.

If the obtained timing at which correlation value $P_{IN}$ was obtained in correlator 4 is not stored in timing-correlation value storage unit 10 and if the obtained correlation value $P_{IN}$ is greater than the $N^{th}$ correlation value $P_N$ that is stored in timing-correlation value storage unit 10, control circuit 9 instructs selector 8 to output the output from multiplier 5 to timing-correlation value storage unit 10.

If the obtained timing at which correlation value $P_{IN}$ was obtained in correlator 4 is not stored in timing-correlation value storage unit 10 and if the obtained correlation value $P_{IN}$ is equal to or less than the $N^{th}$ correlation value $P_N$ that is stored in timing-correlation value storage unit 10, control circuit 9 instructs timing-correlation value storage unit 10 not to process output from selector 8. Control circuit 9 then performs synchronization acquisition by outputting the timing stored in timing-correlation value storage unit 10 upon completion of correlation value calculations equal in number to a prescribed number of slot averaging.

Figure 10:
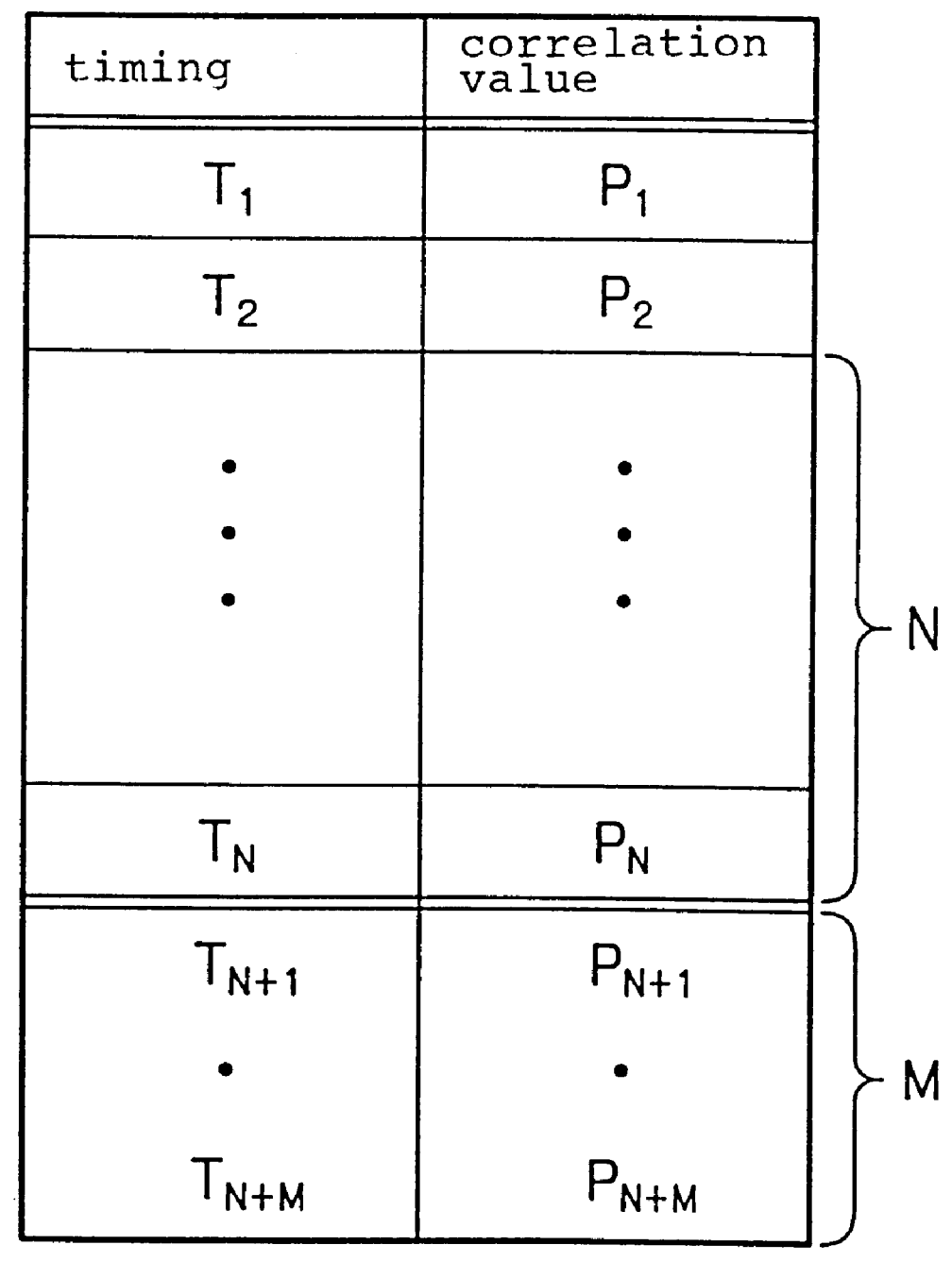

Timing-correlation value storage unit 10 stores the data of correlation values together with the associated timings. FIG. 10 shows the content of data that are stored in timing-correlation value storage unit 10.

Timing-correlation value storage unit 10 stores N+M combinations of correlation values and timings. The $N^{th}$ highest-ranking item of data is timing $T_N$ and correlation value $P_N$. As actual values for N and M, N may be, for example, 20, and M may be 10.

Figure 11:
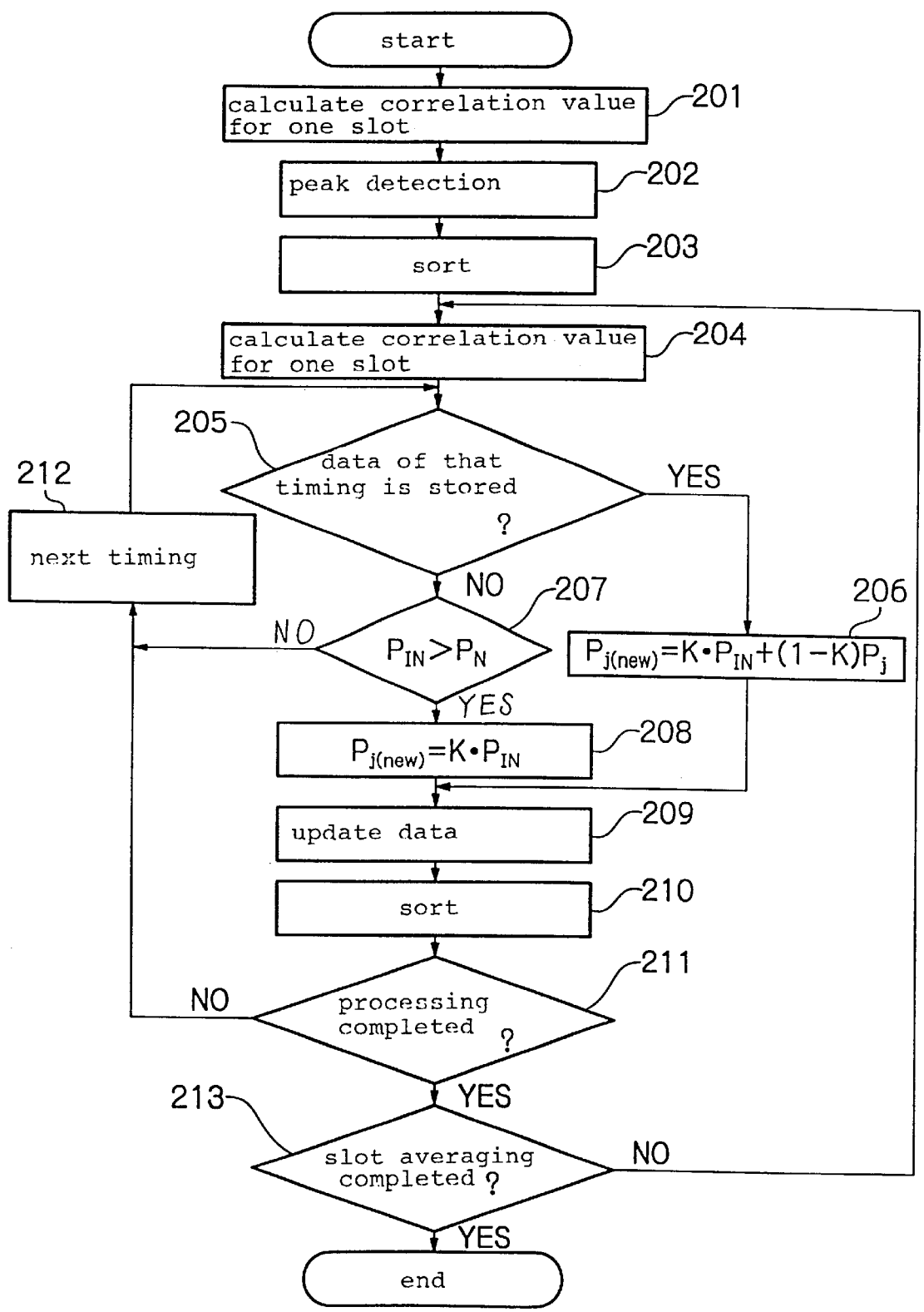
FIG. 11 is a flow chart showing the operation of synchronization acquisition device 3 of FIG. 9.

Referring now to the flow chart of FIG. 11, explanation is next presented regarding the operation of synchronization acquisition device 3 of this embodiment. First, in Step 201, when digital data from A/D converter 2 are received in correlator 4 for each timing, the correlation values are calculated for each timing of one slot portion of these digital data.

In Step 202, control circuit 9 next detects peaks in the correlation values that were found in correlator 4, determines the N cases having the highest correlation values to be peaks, and then causes the timings and correlation values of only cases judged to be peaks to be stored in timing-correlation value storage unit 10.

In Step 203, control circuit 9 sorts the data that are stored in timing-correlation value storage unit 10 according to the size of the correlation values. In Step 204, the correlation value calculation of data for the next slot portion is carried out at correlator 4.

The following processes are carried out sequentially in control circuit 9 for the correlation values of each of the timings. First, control circuit 9 determines whether or not data for a timing are already stored in timing-correlation value storage unit 10 in Step 205. If it is determined in Step 205 that data are stored, control circuit 9 effects control in Step 206 such that selector 8 outputs the data of adder 7 to timing-correlation value storage unit 10, whereby the data $P_{j(new)}$ outputted from selector 8 becomes the value shown in the following equation (1)

$$P_{j(new)}=K \times P_{IN}+(1-K) \times P_j \qquad (1)$$

where $P_j$ represents the correlation value read from timing-correlation value storage unit 10, and $P_{j(new)}$ represents the correlation value stored in timing-correlation value storage unit 10 in place of $P_j$.

If it is determined in Step 205 that data for that timing are not stored in timing-correlation value storage unit 10, control circuit 9 compares correlation value $P_{IN}$ and the $N^{th}$ correlation value $P_N$ that is stored in timing-correlation value storage unit 10 in Step 207.

If it is determined in Step 207 that correlation value $P_{IN}$ is equal to or smaller than correlation value $P_N$, control circuit 9 then proceeds to processing of the correlation value of the next timing in Step 212.

If it is determined in Step 207 that correlation value $P_{IN}$ is greater than correlation value $P_N$, control circuit 9 directs selector 8 to output the output data of multiplier 5 to timing-correlation value storage unit 10, whereby data $P_{j(new)}$ outputted from selector 8 becomes the value shown in the following equation (2):

$$P_{j(new)}=K \times P_{IN} \qquad (2)$$

If a new correlation value $P_{j(new)}$ was obtained in Step 206 or Step 208, this correlation value $P_{j(new)}$ is stored in timing-correlation value storage unit 10 in place of correlation value $P_j$ in Step 209. Control circuit 9 then sorts data that are stored in timing-correlation value storage unit 10 according to the size of the correlation values in Step 210.

In Step 211, control circuit 9 determines whether or not processing has been completed for all of the timings of the data of one slot portion. If it is determined in Step 211 that processing has been completed for all of the timings of data of one slot portion, the operation proceeds to Step 213. If it is determined in Step 211 that processing has not been completed for all timings, processing of the next timing is carried out in Step 212.

Control circuit 9 repeats the processing of Steps 204–211 a prescribed number of times equal to the number of slot averaging, and if control circuit 9 determines in Step 213 that processing has been completed for data of slots of the prescribed number of slot averaging, the N highest-ranking correlation values that are stored in timing-correlation value storage unit 10 are outputted as the obtained spreading timing and all processing is completed.

Figure 12:
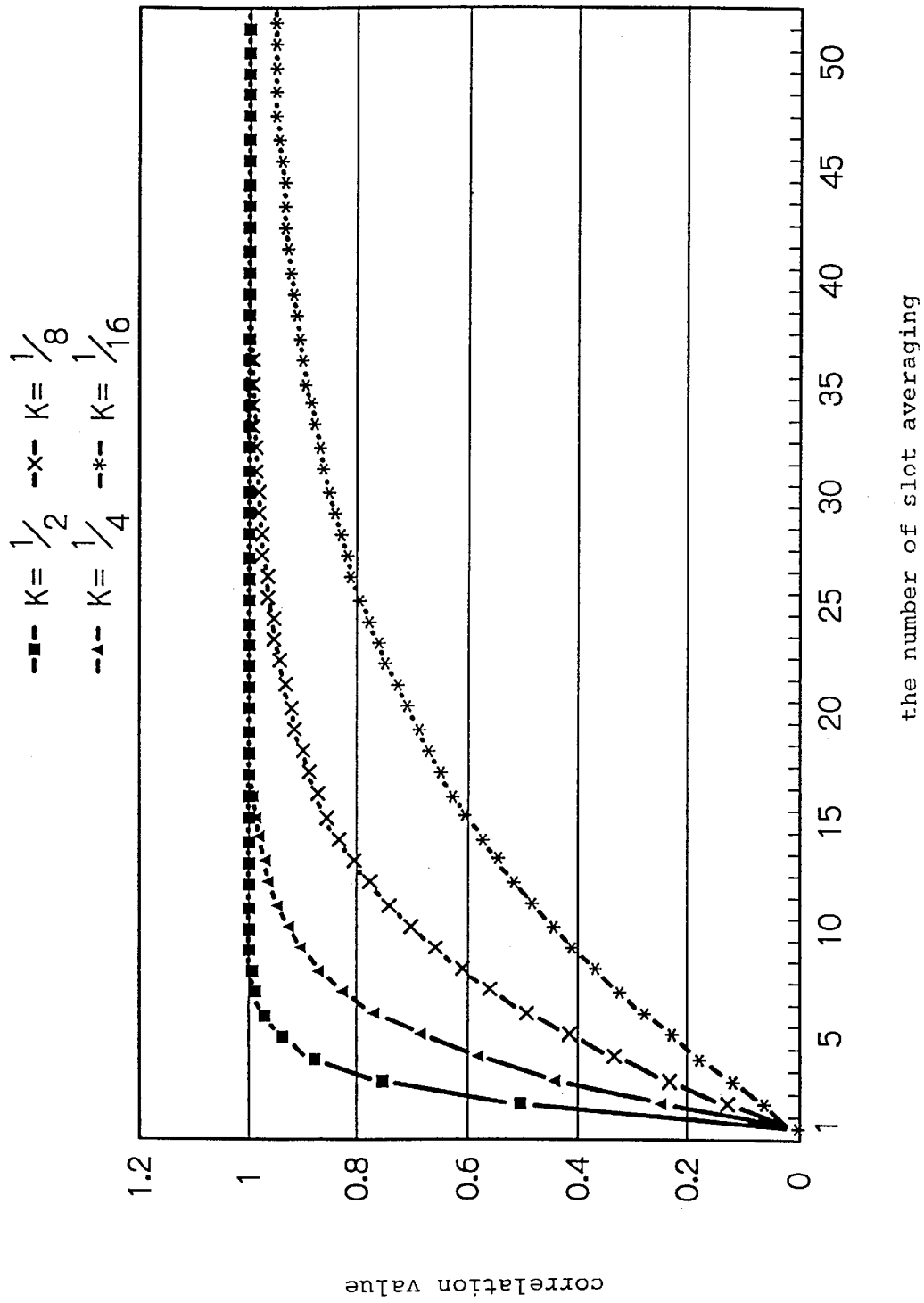
FIG. 12 shows the relation between the number of slot averaging and the correlation values when the value of K varies.

Although the number of slot averaging is a predetermined value in this embodiment, it should be clear from FIG. 12 that, according to the averaging method of this invention, there is no need to limit this value to a specific number of slot averaging and the value can be any number of averages.

Figure 13:
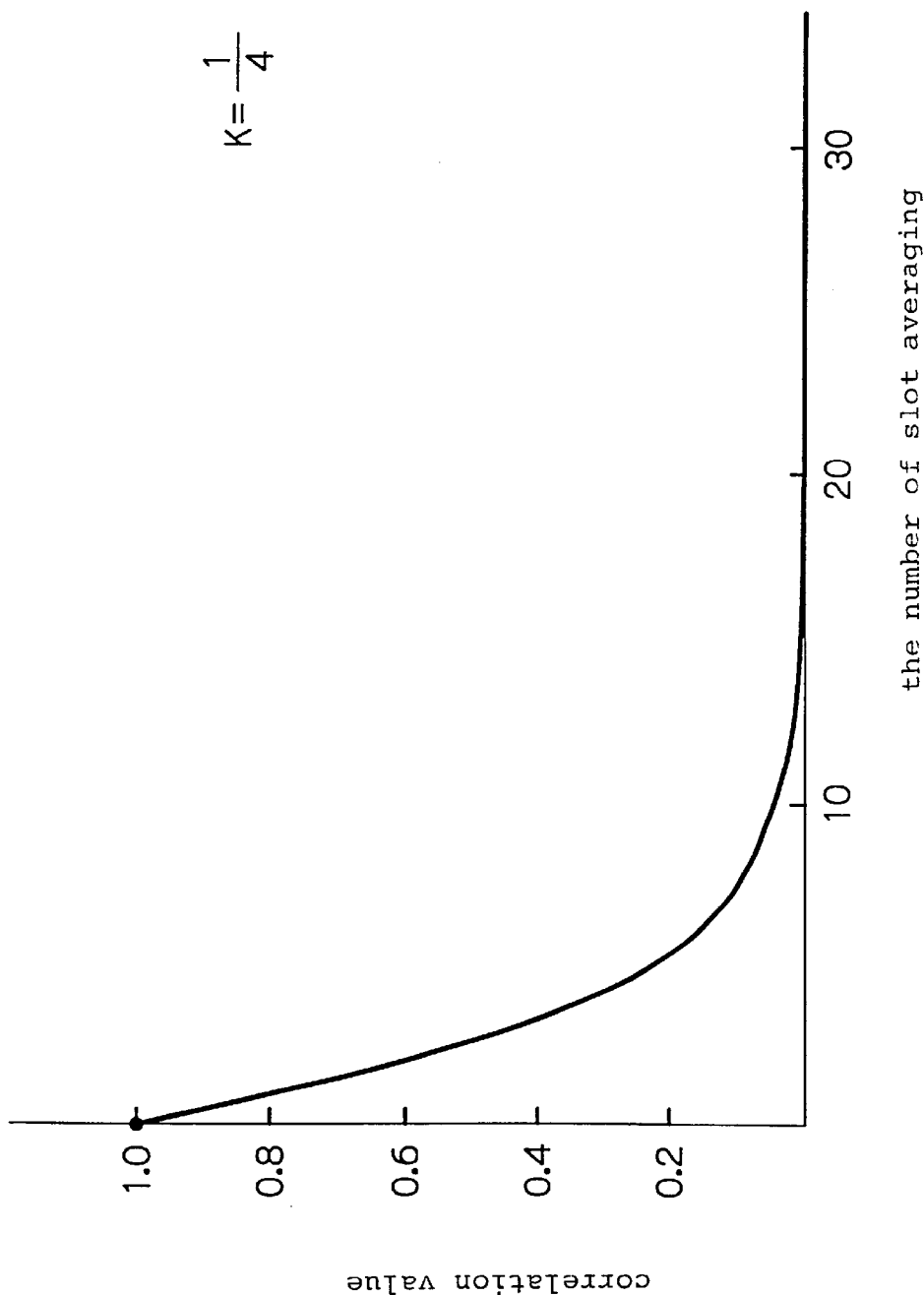
FIG. 13 shows the relation between the number of slot averaging and the correlation values in a case in which irrelevant data which do not correspond to the base station are stored in the first correlation calculation.
Figure 14:
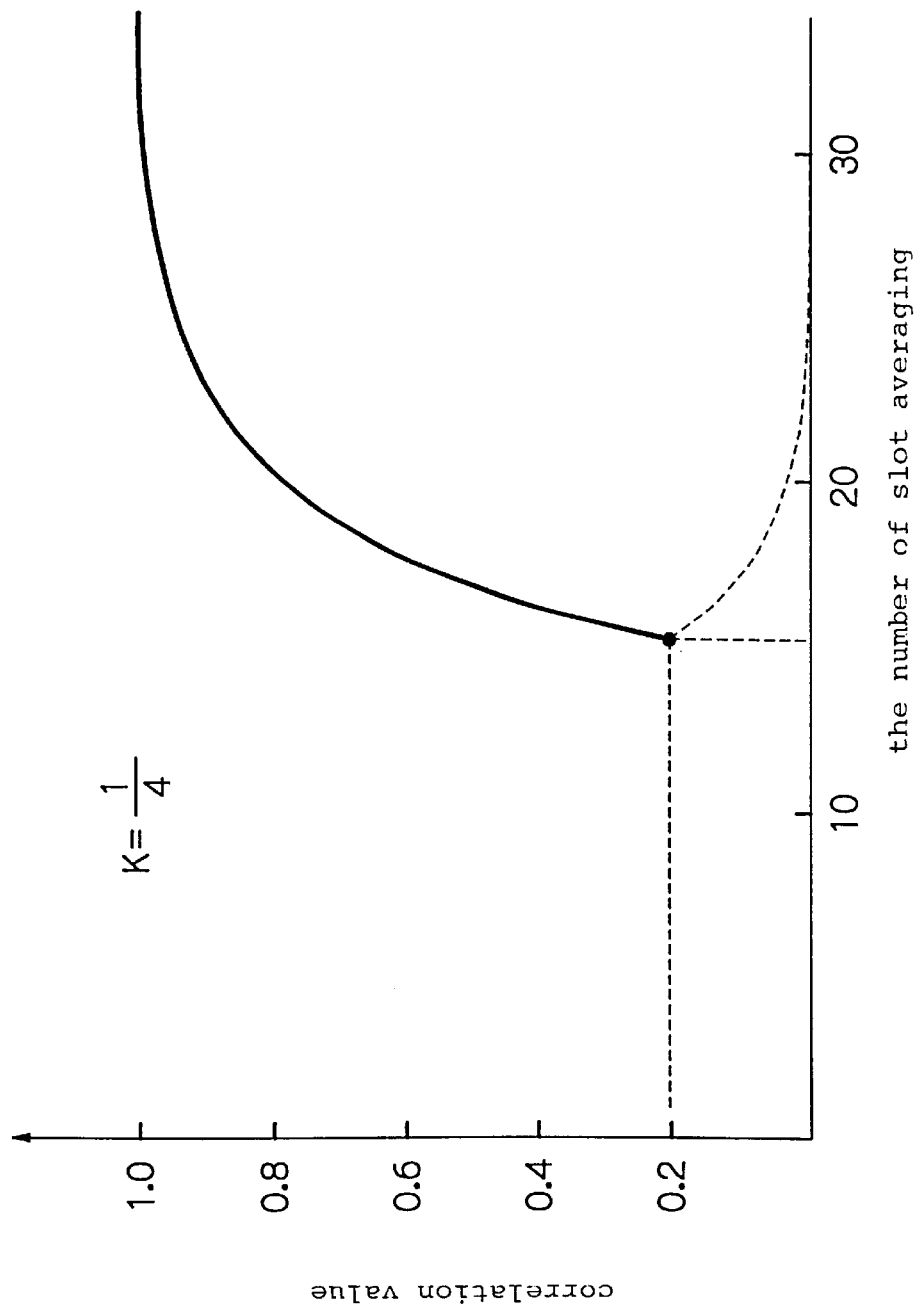
FIG. 14 shows the relation between the number of slot averaging and the correlation values in a case in which new timing data are added during an operation.

Referring now to FIGS. 12–14, explanation is next presented regarding the manner in which the correlation values stored in timing-correlation value storage unit 10 change in synchronization acquisition device 3 of this embodiment. In FIGS. 12–14, correlation values are shown as a ratio for a case in which the actual correlation value is "1."

FIG. 12 shows the relation between the number of slot averaging and correlation values of a timing that is not stored in timing-correlation value storage unit 10 in the first correlation value calculation while varying the value of coefficient K.

As can be seen from FIG. 12, the correlation value approaches 1 in fewer calculations as the value of coefficient K increases. The stored correlation value therefore approaches the actual value in fewer times as the value of coefficient K increases even in the case of a timing that was not stored in timing-correlation value storage unit 10 by the first correlation value calculation. Further, the stored correlation value approaches the actual value in fewer times as the value of coefficient K increases even in a case in which the correlation value of a particular timing increases during processing.

FIG. 13 shows the relation between correlation value and the number of slot averaging for a case in which timing data not relevant to the base station due to such factors as noise are stored in the first correlation value calculation. FIG. 13 shows only a case in which coefficient K=¼. In FIG. 13, the correlation values that are stored in timing-correlation value storage unit 10 become progressively smaller because high correlation values are not obtained in the second and subsequent correlation value calculations. In this case, however, a large value of coefficient K will result in no storage in timing-correlation value storage unit 10 after fewer calculations.

FIG. 14 shows the relation between the correlation values and the number of slot averaging for a case in which data of a new timing are added midway during processing. FIG. 14 shows only a case in which coefficient K=¼. In FIG. 14, the solid line represents data of the added new timing that are data that correctly correspond to the base station, and the broken lines represent added new timing data that are data such as noise that are not relevant to the base station. FIG. 14 shows an example in which a value of 0.8 is obtained as the correlation value in the $15^{th}$ correlation value calculation, the value 0.8×¼=0.2 being newly stored in timing-correlation value storage unit 10.

As shown in FIG. 14, the correlation values increase with each increase in the number of calculations if the added new timing data are data that correctly correspond to the base station, and the correlation values decrease with each increase in the number of calculations if the added new timing data are data such as noise that do not correspond to the base station.

As explained in the above-described FIGS. 12–14, the amount of variation in correlation values increases with increase in the value of coefficient K. However, if data such as noise that do not correspond to the base station are stored as correlation values in timing-correlation value storage unit 10, setting the coefficient too high results in values being stored to timing-correlation value storage unit 10 in which these erroneous correlation values are a large component, thus increasing the possibility that synchronization cannot be caught. As a result, the value of coefficient K is preferably set to an optimum value by field tests using actual device.

Figure 5:
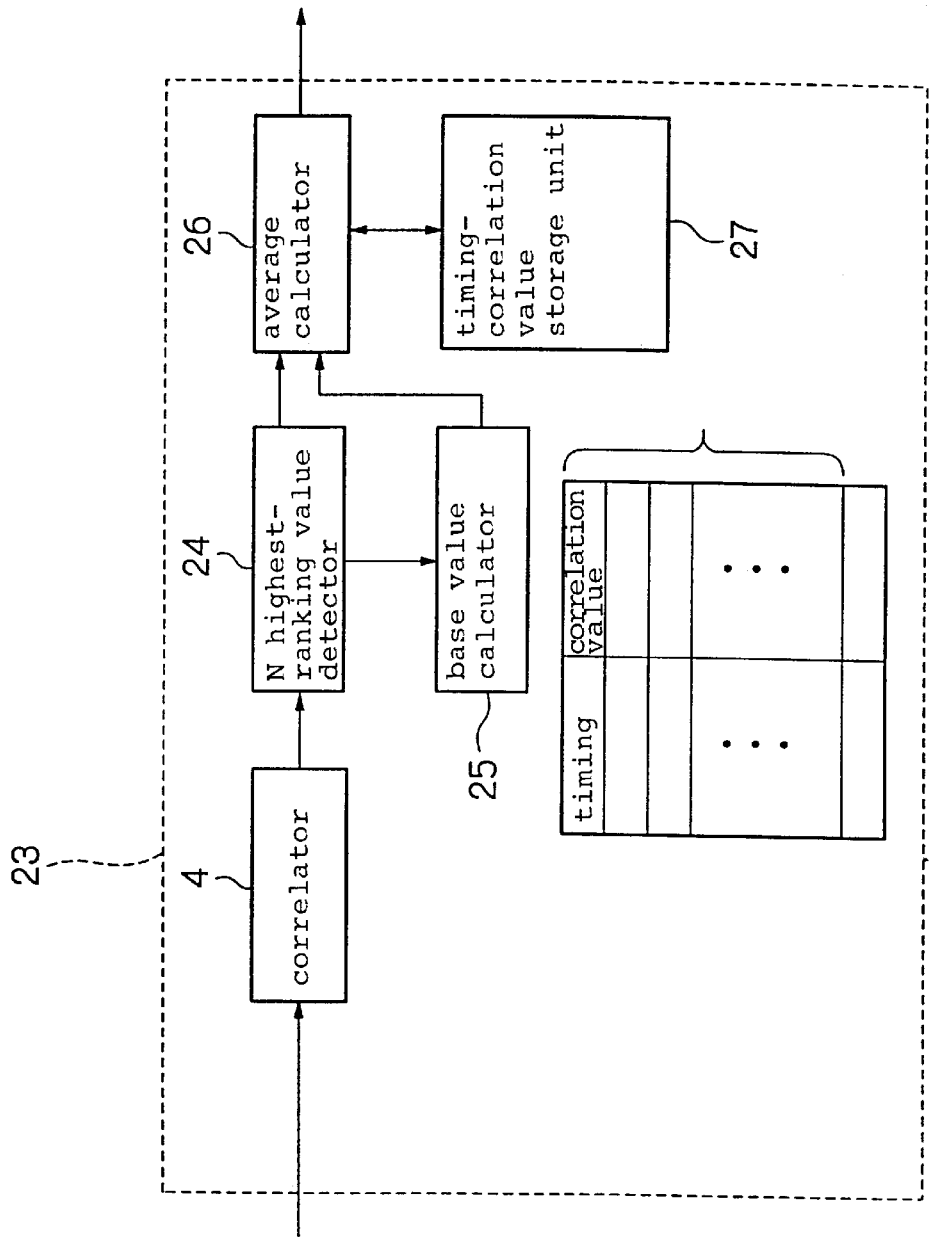
FIG. 5 is block diagram showing the configuration of another prior art synchronization acquisition device 23 of a spread spectrum communication system.
Figure 6:
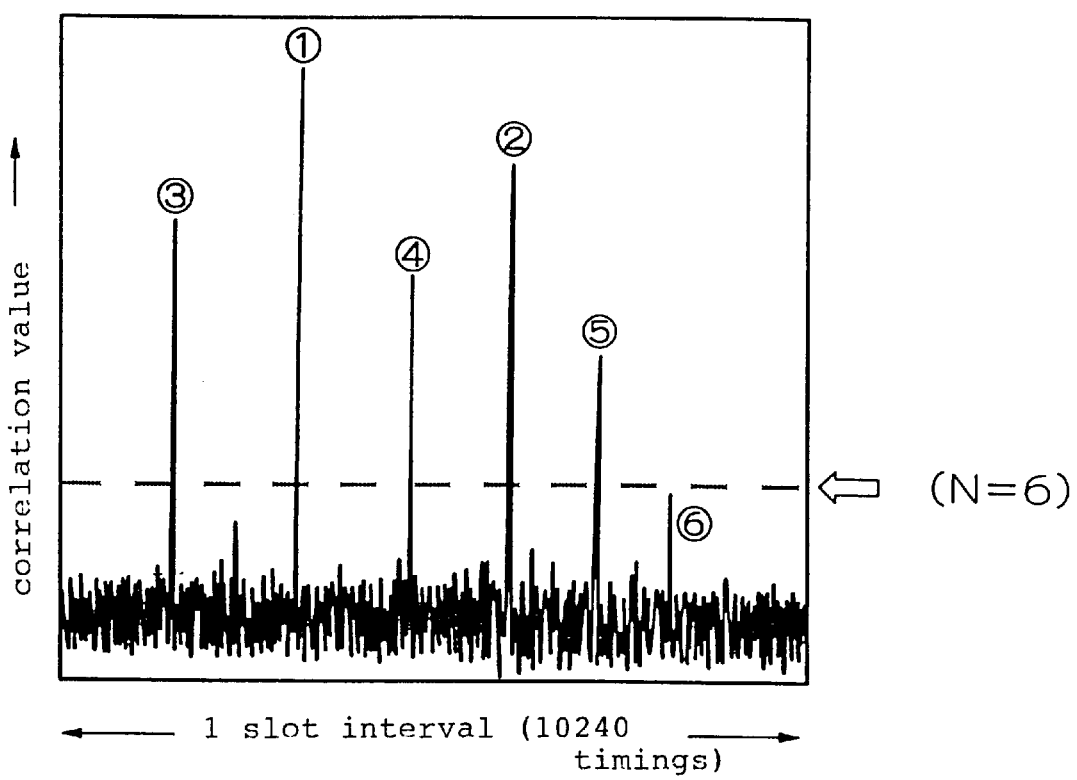
FIG. 6 is a graph of correlation values at each timing in the correlation results outputted from correlator 4.
Figure 7:
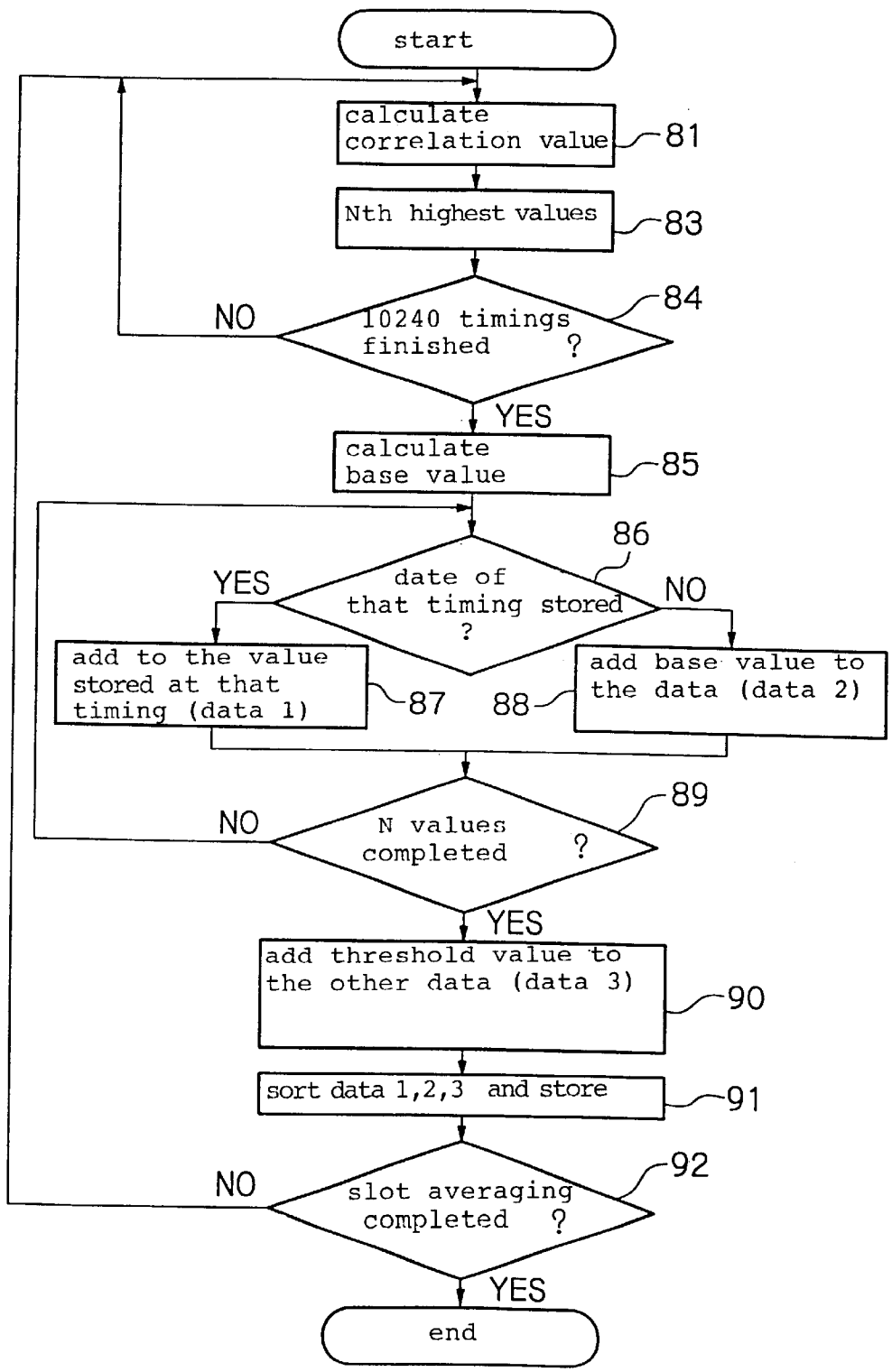
FIG. 7 is a flow chart for explaining the operation of synchronization acquisition device 23 of FIG. 5.
Figure 8A:
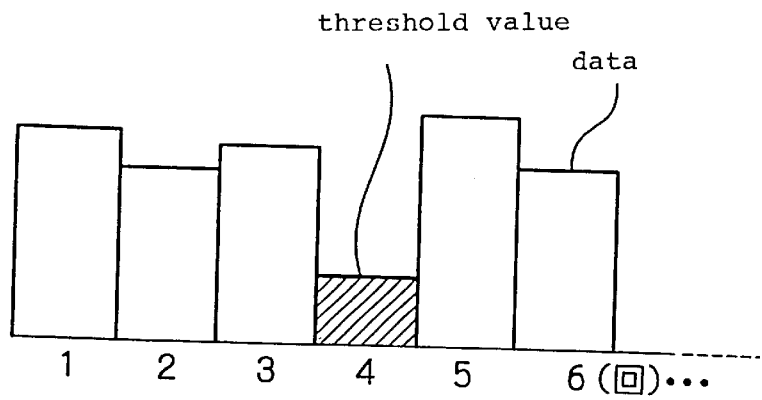
FIGS. 8a–8c show variations in correlation values to explain the operation of synchronization acquisition device 23 of FIG. 5.
Figure 8B:
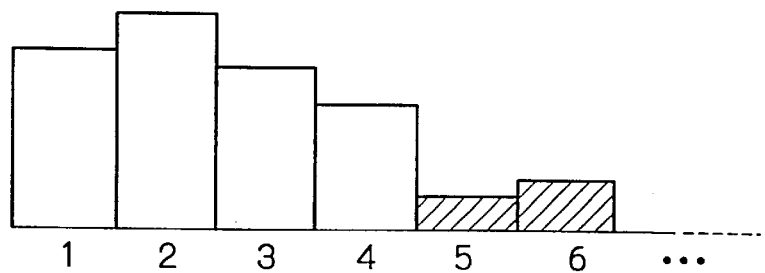
Figure 8C:
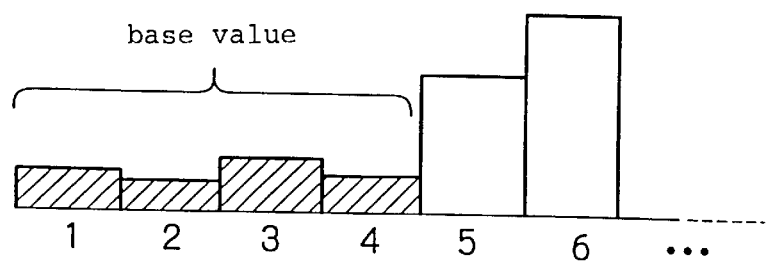

In the synchronization acquisition device 3 of the present embodiment, rather than saving the correlation values of all timings of one slot portion in timing-correlation value storage unit 10, only correlation values that are peak candidates and their associated timing information are stored in timing-correlation value storage unit 10. The required storage capacity therefore can be cut, similar to synchronization acquisition device 23 of the prior art shown in FIG. 5.

In synchronization acquisition device 3 of the present embodiment, the amount of data to be held in timing-correlation value storage unit 10 in a case in which, for example, N=20, M=10, and the timing information is 14 bits, is: 30×(32 bits (data)+14 bits (timing information)). This amount of data is approximately ¹⁄₂₃₇ the amount of 10240× 32 bits, which is the amount of memory in synchronization acquisition device 13 of the prior art shown in FIG. 3. Thus, synchronization acquisition device 3 can cut the amount of memory required in slot averaging calculation processing, and can therefore reduce circuit scale, just as synchronization acquisition device 23 shown in FIG. 5.

Further, in average processing for calculating the average of the correlation values of a plurality of slots in synchronization acquisition device 3 of the present embodiment, reordering of the timings that serve as peak candidates is carried out based only on actual correlation values without using dummy values such as the threshold values and base values of prior-art synchronization acquisition device 23, thereby reducing erroneous detection arising from such factors as noise. As a result, the use of synchronization acquisition device 3 in the present embodiment can cut the storage capacity required in timing-correlation value storage unit 10, and can achieve synchronization acquisition of greater accuracy.

Although correlator 4 in the present embodiment carries out quadruple over-sampling of correlation values and produces 32-bit data, the present embodiment is not limited to these values and can be applied to cases of other values.

Although the explanation in the present embodiment uses a case in which coefficient K was fixed, the present invention is not limited to this form and can be similarly applied to a case in which the value of coefficient K is a variable. As one form that can be considered in such a case, K may be, for example, 1 in the first calculation and ¼ in the second and subsequent calculations.

Figure 1:
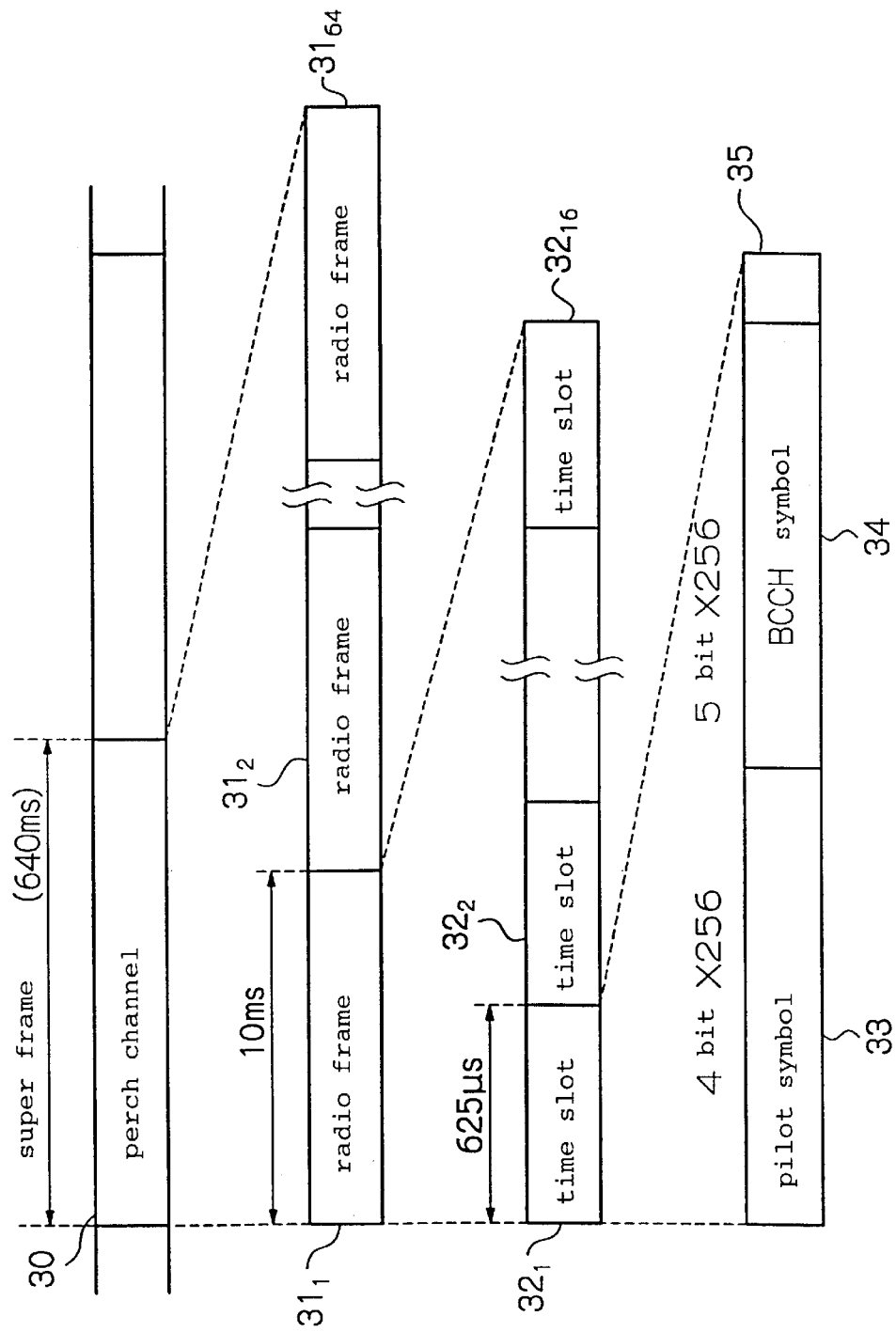
FIG. 1 shows one example of the data structure in a spread spectrum communication system.
Figure 2:
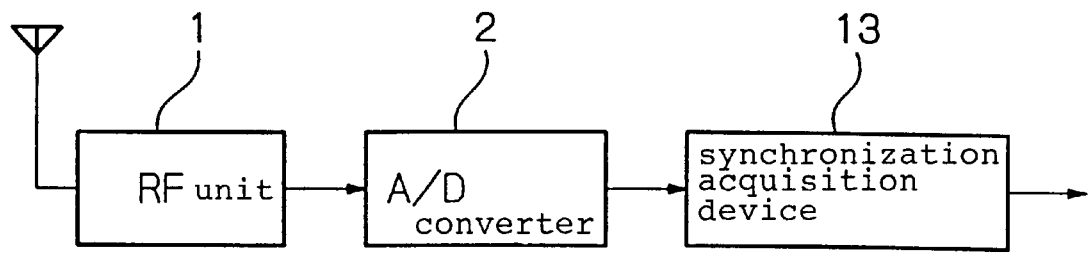
FIG. 2 is a block diagram showing the configuration of a receiver of a spread spectrum communication system.
Figure 3:
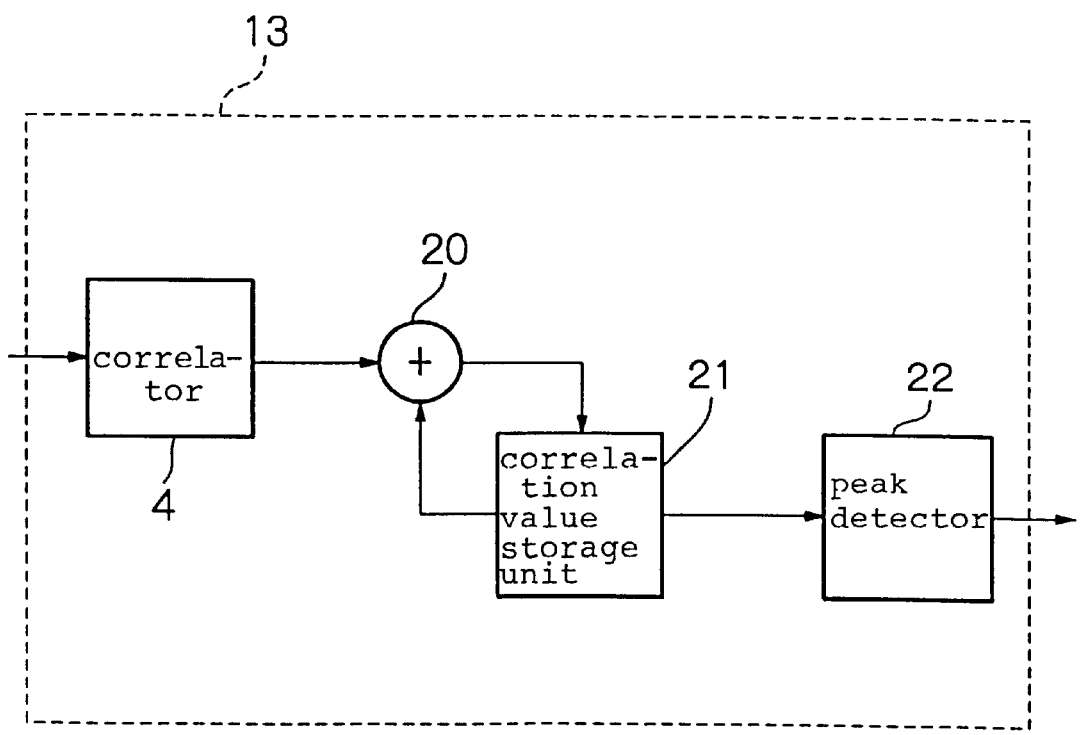
FIG. 3 is a block diagram showing the configuration of synchronization acquisition device 13 in FIG. 2.
Figure 4:
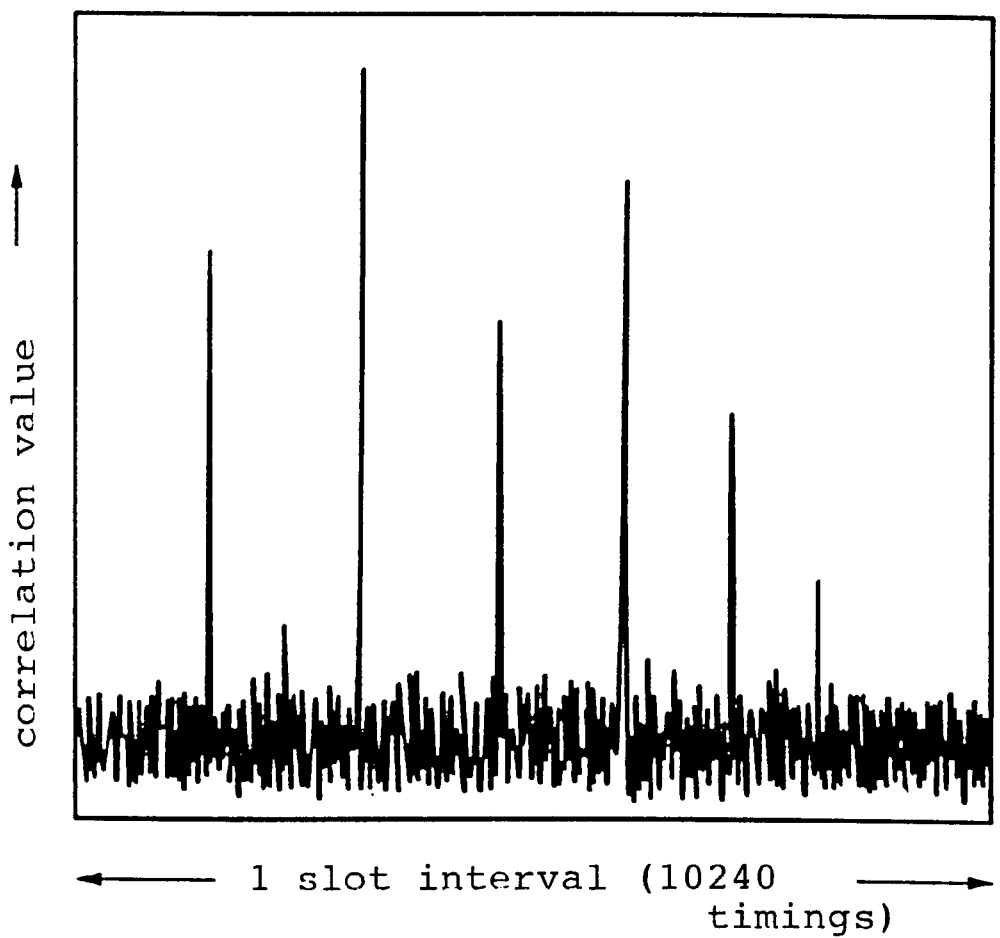
FIG. 4 is a graph of correlation values at each timing in the correlation results outputted from correlator 4.

Furthermore, although the N highest-ranking timings and correlation values are stored in timing-correlation value storage unit 10 in the first correlation value calculation in the present embodiment, the present invention is not limited to this form and may be similarly applied to a case in which the data of all timings and correlation values are stored in timing-correlation value storage unit 10, as in synchronization acquisition device 13 shown in FIG. 3. Since more recent data can be weighted in such a case, data in which, for example, the value steadily increases can be quickly incorporated into a list.

While a preferred embodiment of the present invention has been described using specific terms, such description is for illustrative purposes only, and it is to be understood that changes and variations may be made without departing from the spirit or scope of the following claims.

What is claimed is:

1. A device for performing synchronization acquisition in a spread spectrum communication system by detecting a specific timing in received signals that is spread by a specific spreading code, said synchronization acquisition device comprising:

a correlation detecting means for calculating correlation values between digital data, which have been obtained by A/D converting said received signals that have been demodulated, and said specific spreading code;

a timing-correlation value storing means for storing both data of correlation values and associated timings;

a first multiplying means for multiplying correlation values obtained by said correlation detecting means by a coefficient $K(0<K\leq1)$ and outputting the result;

a second multiplying means for multiplying correlation values read from said timing-correlation value storing means by a coefficient $(1-K)$ and outputting the result;

an adding means for adding values outputted from said first multiplying means and values outputted from said second multiplying means and outputting the result;

a selecting means for selecting and outputting one of the output of said adding means and the output of said first multiplying means; and a control means for:

in the first correlation value calculation, storing in said timing-correlation value storing means only data of the N highest-ranking correlation values of a fixed interval portion obtained in said correlation detecting means, N being a predetermined number; and in the second and subsequent correlation value calculations, determining whether or not a timing for which a correlation value is obtained in said correlation detecting means is stored in said timing-correlation value storing means;

instructing said selecting means to output the output from said adding means to said timing-correlation value storing means if the timing is stored in said timing-correlation value storing means; instructing said selecting means to output the output from said first multiplying means to said timing-correlation value storing means if the timing is not stored in said timing-correlation value storing means and if the associated correlation value is greater than the $N^{th}$ correlation value $P_N$ stored in said timing-correlation value storing means;

instructing said timing-correlation value storing means not to carry out any processing on output from said selecting means if the timing is not stored in said timing-correlation value storing means and if the associated correlation value is equal to or less than the $N^{th}$ correlation value $P_N$ that is stored in said timing-correlation value storing means; and outputting the timing information stored in said timing-correlation value storing means upon completion of correlation value calculations equal in number to a prescribed number of averages.

2. A device in a spread spectrum communication system according to claim 1, wherein said correlation detecting means is a matched filter.

3. A device in a spread spectrum communication system according to claim 1, wherein said correlation detecting means is a correlator bank.

4. A device in a spread spectrum communication system according to claim 1, wherein said coefficient K is a variable.

5. A device in a spread spectrum communication system according to claim 4, wherein said coefficient K in the first correlation value calculation is different from coefficient K in the second and subsequent correlation value calculations.

6. A method of performing synchronization acquisition in a spread spectrum communication system by detecting a specific timing in received signals that is spread by a specific spreading code, said method of performing synchronization acquisition comprising the steps of:

sequentially calculating correlation values between digital data, which are obtained by A/D converting said received signals that are demodulated, and said specific spreading code;

in a first correlation value calculation, storing only data of the N highest-ranking correlation values of the correlation values of a fixed interval portion, N being a predetermined number;

in second and subsequent correlation value calculations, determining whether or not a timing for which a correlation value has been obtained is stored, and if stored, multiplying the associated correlation value by a coefficient $K(0<K\leq1)$, multiplying the stored correlation value by a coefficient $1-K$, adding these two multiplication results, and storing the addition result as a new correlation value;

if the timing is not stored and if the associated correlation value is greater than the $N^{th}$ correlation value $P_N$ that is stored, multiplying said associated correlation value by said coefficient K and storing the result of multiplication as a new correlation value;

if the timing is not stored and if the associated correlation value is equal to or less than the $N^{th}$ correlation value $P_N$ that is stored, leaving the stored correlation value unchanged; and outputting the stored timing information upon completion of correlation value calculations equal in number to a prescribed number of averages.

7. A method according to claim 6, wherein said coefficient K is a variable.

8. A method according to claim 7, wherein said coefficient K in the first correlation value calculation is different from coefficient K in the second and subsequent correlation value calculations.

* * * * *